(12) United States Patent
Watanabe et al.

(10) Patent No.: US 7,512,459 B2
(45) Date of Patent: Mar. 31, 2009

(54) ROBOT OFF-LINE SIMULATION APPARATUS

(75) Inventors: Atsushi Watanabe, Tokyo (JP); Yoshiharu Nagatsuka, Yamanashi (JP); Tetsuya Kosaka, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 811 days.

(21) Appl. No.: 10/882,240

(22) Filed: Jul. 2, 2004

(65) Prior Publication Data

US 2005/0004709 A1     Jan. 6, 2005

(30) Foreign Application Priority Data

Jul. 3, 2003     (JP) ............... 2003-270606

(51) Int. Cl.
*G06F 19/00*     (2006.01)
(52) U.S. Cl. ............... 700/245; 700/264; 703/6; 345/419
(58) Field of Classification Search ............... 700/245, 700/275; 703/6
See application file for complete search history.

(56) References Cited

U.S. PATENT DOCUMENTS

| | | | | |
|---|---|---|---|---|
| 5,155,423 | A * | 10/1992 | Karlen et al. | 318/568.11 |
| 5,488,689 | A * | 1/1996 | Yamato et al. | 700/264 |
| 6,181,983 | B1 * | 1/2001 | Schlemmer et al. | 700/245 |
| 6,226,567 | B1 * | 5/2001 | Kaneko et al. | 700/264 |
| 6,526,373 | B1 * | 2/2003 | Barral | 703/6 |
| 6,642,922 | B1 * | 11/2003 | Noda | 345/419 |
| 6,662,082 | B2 * | 12/2003 | Hiruma | 700/245 |

FOREIGN PATENT DOCUMENTS

| | | |
|---|---|---|
| EP | 1 331 580 | 7/2003 |
| JP | 4-205062 | 7/1992 |
| JP | 6-348769 | 12/1994 |
| JP | 10-39909 | 2/1998 |
| JP | 2001-166806 | 6/2001 |
| WO | WO 02/37341 | 5/2002 |

OTHER PUBLICATIONS

Notice of Reasons for Rejection dated Jul. 5, 2005.

* cited by examiner

*Primary Examiner*—Khoi Tran
*Assistant Examiner*—Jonathan Goldfarb
(74) *Attorney, Agent, or Firm*—Staas & Halsey LLP

(57) ABSTRACT

A robot off-line simulation apparatus that allows a person to know an optimum placement for a robot, an operation margin index, etc. before going to an actual working site. Provisional robot placing positions are selected using data about a given sequence of task points (operation path), etc. The conditions for selection are (i) that solution to the inverse kinematics should be found regarding the entire sequence of task points, (ii) that the robot should not interfere with a peripheral device, and (iii) that regarding all the axes of the robot, the operation margin index should satisfy a criterion value. Simulation is performed according to operation programs under the condition that the robot is placed at each of the provisional placing positions, where data about cycle time, duty, energy value, change in acceleration/speed, etc. is collected. Using the collected data, evaluation of operation is performed regarding each of the provisional placing positions, and those provisional placing positions which allow good operation are identified as placing positions ensuring the robot operation. Further, using an evaluation function in which each aspect is given a weighting, the placing positions ensuring the robot operation are reduced to optimum placing positions ensuring the robot operation.

17 Claims, 7 Drawing Sheets

FIG. 2
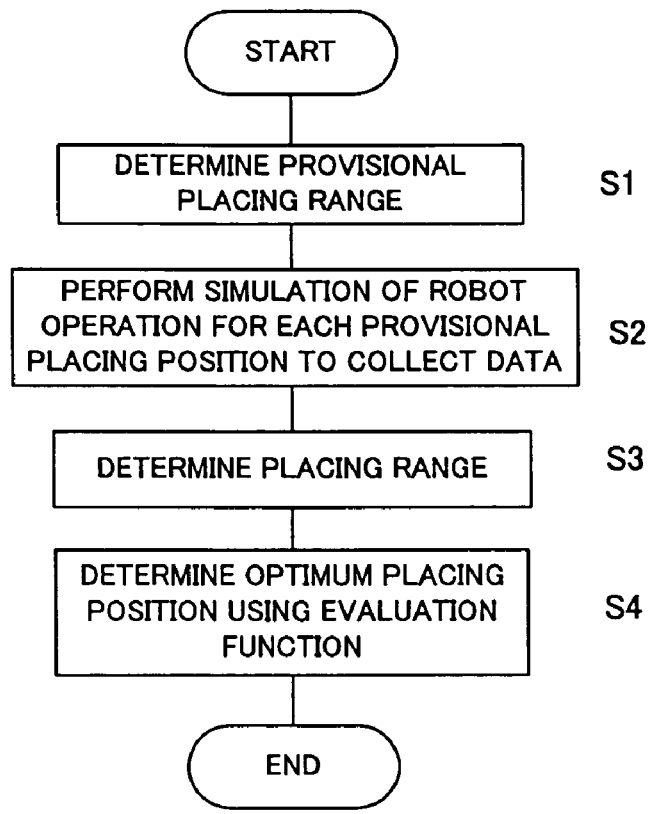
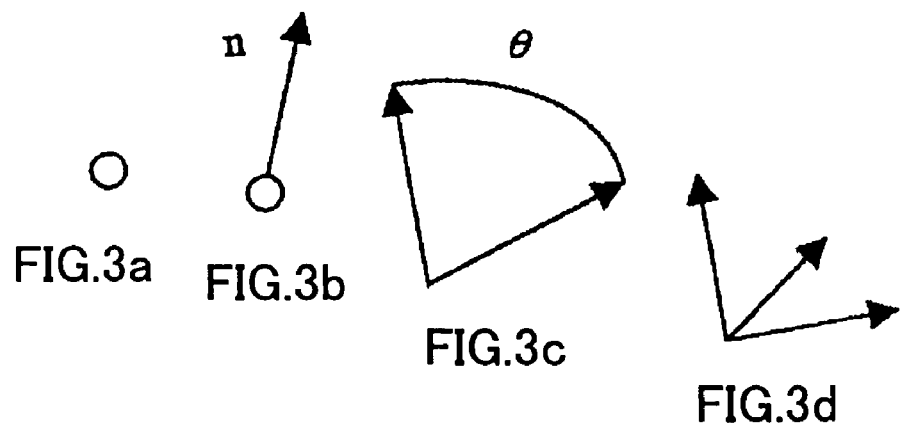

OPERATION MARGIN INDEX $= \left| \dfrac{\theta - (\theta_u + \theta_d)/2}{(\theta_u - \theta_d)/2} \right|^N$ $\theta_d$: MINIMUM VALUE
$\theta_u$: MAXIMUM VALUE (N: FIXED AT 3)

WHERE $\theta_d = 30$, $\theta_u = 270$, N=3

FIG. 9

| RESULT LIST | | | | | | | | | |
|---|---|---|---|---|---|---|---|---|---|
| | X | Y | Z | W | P | R | Time | Limit | |
| ◯ | -200.00 | 0.00 | 0.00 | 0.00 | 0.00 | 0.00 | 2.248 | 0.302 | |
| ◯ | 0.00 | 0.00 | 0.00 | 0.00 | 0.00 | 0.00 | 2.448 | 0.266 | |
| ◯ | 200.00 | 0.00 | 0.00 | 0.00 | 0.00 | 0.00 | 2.808 | 0.296 | |
| X | 400.00 | 0.00 | 0.00 | 0.00 | 0.00 | 0.00 | --- | 0.000 | |
| X | -400.00 | 0.00 | 0.00 | 0.00 | 0.00 | 0.00 | --- | 0.000 | |

REACHABILITY — PLACING POSITION — CYCLE TIME — MARGIN INDEX

ROBOT OFF-LINE SIMULATION APPARATUS

BACKGROUND OF THE INVENTION

1. Field of the Invention

The present invention relates to a robot off-line simulation apparatus for performing simulation of operation of a robot, more specifically a robot off-line simulation apparatus having a function of obtaining an optimum placement for a robot.

2. Description of Related Art

A robot off-line simulation apparatus for performing off-line simulation of operation of a robot is known to the public. When simulation of operation of a robot is performed with this apparatus, generally the three-dimensional models of a robot, a workpiece, a peripheral device, etc. are placed and displayed -on a screen simultaneously. Obviously, the result of the simulation varies to a large degree depending on where the robot is placed on the screen (more precisely, in a space represented by the robot off-line simulation apparatus). If the robot is placed at an inappropriate position, it causes problems such that a task point or a part of an operation path for the robot proves to be in a region where the robot cannot operate, or that the robot interferes with a peripheral device when the robot is made to operate on an intended sequence of task points or an intended operation path.

Hence, conventionally, an operator obtains a robot placing position that satisfies the conditions that the robot should be able to operate at all the task points or over the entire operation path, and that the robot should not interfere with the peripheral device, through a trial-and-error process of placing the robot on the screen over and over. However, even when a robot system is built on the basis of a robot placing position determined to satisfy the conditions as mentioned above, it is not rare that problems occur such that the determined placing position is not optimal, so that the cycle time and duty of the robot exceed stipulated values. Problems like these are dealt with by reviewing and changing the placing positions for the robot, the workpiece and the peripheral device.

Further, even when a robot placing position thought to produce good results is determined in the simulation system in the conventional manner described above, problems occur such that when the real robot is placed at the determined placing position on an actual working site, it turns out that the robot cannot operate at the determined placing position on the actual working site although on the screen, it appears to be able to operate. Hence, the robot placement needs to be changed on the working site, which is very inefficient. This comes from the fact that it is actually very difficult to make the on-screen positional relationship between the robot and the peripheral device perfectly correspond to the real positional relationship between them. Generally, it is inevitable that the former differs from the latter to some degree. It is to be noted that Japanese Unexamined Patent Publication No. 2001-166806 refers to the related art.

As mentioned above, there are following problems: Even if a robot placing position thought to ensure that the robot will be able to operate at all the task points or over the entire operation path and that the robot will not interfere with the peripheral device is obtained on the robot off-line programming system, it is not sufficient. How it will be on the actual working site needs to be considered. Even if the robot can be placed at a certain position on the screen, it does not mean that the robot can be placed at that position on the actual working site, because there is discrepancy between a placement on the screen and a placement on the actual working site, so that the operating range of the robot on the screen is different from that on the actual working site. Further, the robot placement needs to be reviewed and changed when it causes trouble in the robot operation. As a result, unexpected time and cost is required to build the robot system.

Conventionally, there is no way to check whether the off-line determined robot placing position is optimal or not. Hence, it is after the system is actually built that it turns out that the cycle time and the duty of the robot exceed the stipulated values. Thus, the placing positions for the robot, the workpiece and the peripheral device often need to be reviewed and changed, and hence, unexpected time and cost is required to build the robot system.

Further, with the technique disclosed in the above-mentioned publication, the problems due to the discrepancy between a placement on the screen and a placement on the actual working site cannot be solved, so that there is a high possibility that the placement needs to be changed on the actual working site.

SUMMARY OF THE INVENTION

The present invention provides a robot off-line simulation apparatus capable of checking whether a placing position of a robot specified by off-line is preferable or not, and to deal with a certain degree of discrepancy between a placement on a screen and a placement on an actual working site.

According to the present invention, the robot off-line simulation apparatus has a function of, when task points or an operation path for a robot is specified in off-line simulation of the robot, calculating an optimum placing position for the robot taking account of the task points or the operation path, and also calculating an index representing an operation margin of the robot. Thus, the present invention enables to determine the optimum placement for the robot through simulation and also obtain information about the operation margin of the robot, in advance of installing the robot at an actual working site.

A robot off-line simulation apparatus of the present invention simulates an operation of a robot to be placed with a workpiece and a peripheral device in a three-dimensional space by simultaneously displaying three-dimensional models of the robot, the workpiece and the peripheral device on a screen.

According to one aspect of the present invention, the simulation apparatus comprises: means for determining discrete positions at which a base of the robot is to be placed, the robot with the base placed at each of the discrete positions being reachable to a preset sequence of task points for performing tasks on the workpiece; means for obtaining an index representing an operation margin of the robot when the robot with the base placed at each of the discrete positions reaches the sequence of task points; and means for displaying the discrete positions and the obtained indices for the respective discrete positions on the screen.

Each of the task points may be given one of a three-dimensional position, a combination of the three-dimensional position and a direction vector, and a combination of the three-dimensional position and an orientation, for performing the task on the workpiece by the robot.

According to another aspect of the present invention, the simulation apparatus comprises: means for determining discrete positions at which a base of the robot is to be placed, the robot with the base placed at each of the discrete positions being reachable to a preset operation path of the robot for performing tasks on the workpiece; means for obtaining an index representing an operation margin of the robot when the robot with the base placed at each of the discrete positions reaches the operation path; and means for displaying the discrete positions and the obtained indices for the respective discrete positions on the screen.

The operational path may be given one of a direction vector and an orientation for performing the task on the workpiece by the robot.

The simulation apparatus may further comprise means for determining whether or not the robot with the base placed at each of the discrete positions interferes with one of the workpiece and the peripheral device when the robot reaches to the sequence of task points, and means for displaying a result of the determination on the screen.

The simulation apparatus may further comprise means for simulating an operation of the robot with the base placed at each of the discrete positions according to an operation program, to obtain an evaluation value regarding an operation performance of the robot using an evaluation function, means for selecting at least one of the discrete positions for which the evaluation values are preferable, and means for displaying the selected discrete positions on the screen.

The evaluation function may be prepared for evaluating the operation performance of the robot with respect to cycle time, duty or energy.

The present invention enables to determine a robot placing position where that the robot is operable at all the task points or over the entire operation path and also the robot does not interfere with the workpiece or the peripheral device in a short time, to expedite a review of the arrangement of the robot system. Further, a person can know how large a margin is left for discrepancy between a placement assumed on the basis of off-line data and a real placement, before going to an actual working site. Hence, placement of the robot on the actual working site is easy to perform, and even an unskilled person can think about a more appropriate way of applying the robot.

Specifically, the present invention makes it possible not only to check in advance whether the robot placing position is optimal or not but also to know how large a margin the placement has. Hence, it is no longer necessary to change the placing positions of the robot, workpiece and peripheral device after the system is actually built. This reduces the cost and time required for building the robot system.

BRIEF DESCRIPTION OF THE DRAWINGS

FIG. 2 is a flow chart showing an overall process in the embodiment, FIG. 3a-3d are diagrams for explaining different types of data about a sequence of task points, where FIG. 3a shows a case in which only a three-dimensional position is specified, FIG. 3b shows a case in which a three-dimensional position and a direction of a normal line to a task surface, i.e. a workpiece surface (a z-axis direction at a task point) are specified, FIG. 3c shows a case in which the three-dimensional position, the direction of the normal line to the task surface and a rotation about the normal are specified, and FIG. 3d shows a case in which a three-dimensional position and a three-dimensional orientation are specified, FIG. 9 is an illustration showing an example of a screen display of results of evaluation regarding selection of placing positions, etc.

DETAILED DESCRIPTION

Figure 1:
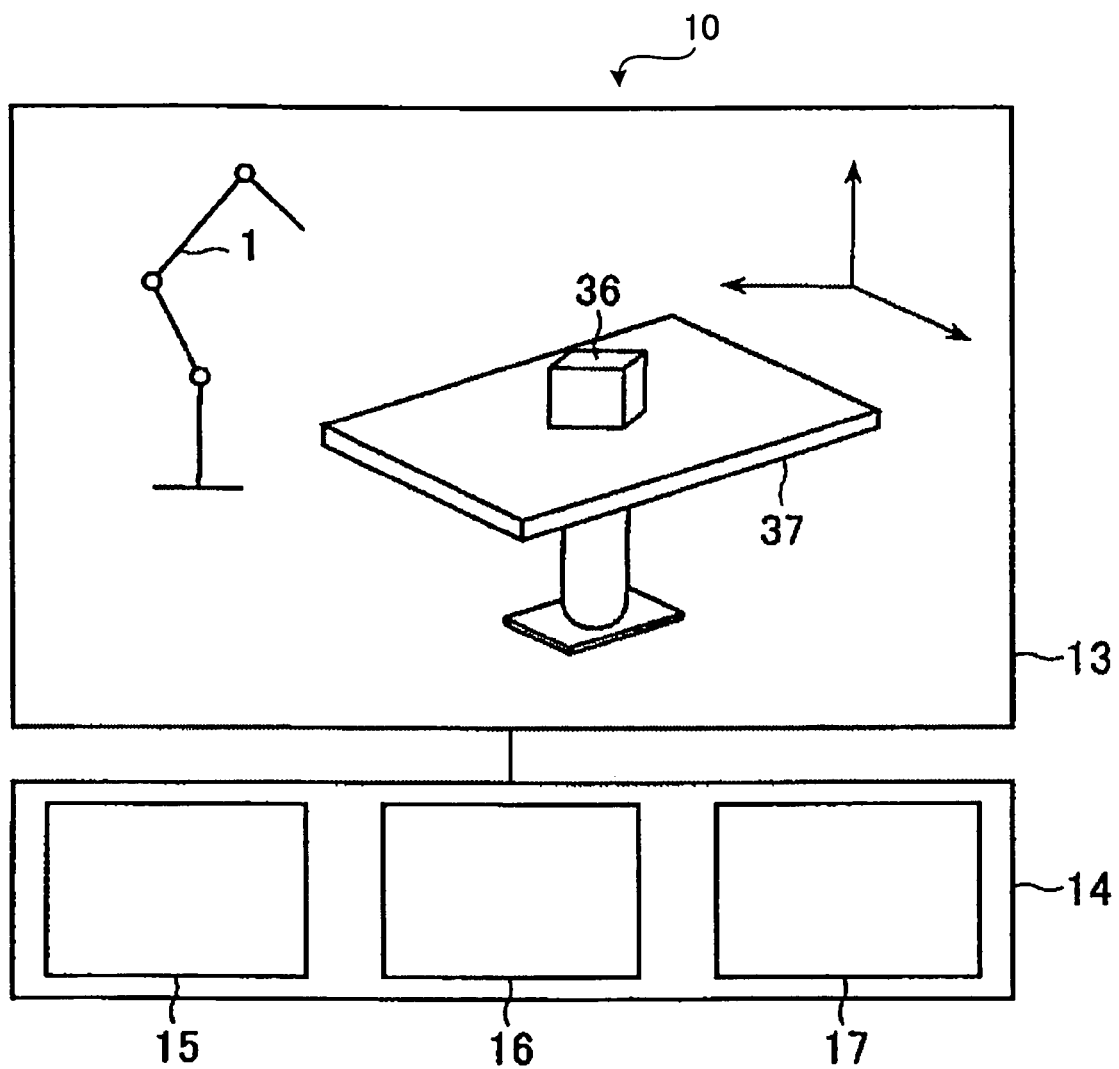
FIG. 1 is a block diagram showing an arrangement of relevant parts of a robot off-line simulation apparatus 1 according to an embodiment.

FIG. 1 is a block diagram showing an arrangement of parts of a robot off-line simulation apparatus 10 according to an embodiment of the invention. As shown in FIG. 1, the robot off-line simulation apparatus 10 as a whole comprises a display part with a screen 13 and a main part 14. The main part 14 includes an animation arithmetic display unit 15, a data storage unit 16, a robot operation/placement arithmetic unit 17.

Although not shown in the figure, a keyboard, a mouse and the like are attached to perform editing, correcting, feeding, etc. of program data, parameter data, instructions, etc. for these parts of the robot off-line simulation apparatus through manual operation, when necessary. Further, a main CPU not shown in the figure performs overall control on the individual parts of the simulation apparatus according to system programs, etc. stored in the data storage unit 16. Further, the simulation apparatus is arranged to be able to send and receive data to and from a CAD system, etc. through an appropriate input/output interface and communication lines (not shown).

Program data, parameter data, etc. required for processing for obtaining an optimum placement, calculation of a margin index, etc., which will be described later, are stored in the data storage unit 16. Start-up of the data storage unit 16, and reading, writing, correcting, etc. of data are controlled by the main CPU.

As shown in FIG. 1, three-dimensional models of a robot 1, a workpiece 36 and a peripheral device (table in the present case) 37 are displayed on the screen 13 at the same time. Data required for placing and displaying them on the screen 13 is fed to the simulation apparatus 10 from, for example an external CAD system through a communication line or by means of an electronic medium or the like. When data is fed, data format conversion, etc. are required. Commercially available software can be used for this purpose. In order to display three-dimensional models, data fed from the CAD system is processed as necessary.

Of the robot 1, the workpiece 36 and the peripheral device 37, the things except the robot 1, namely the workpiece 36 and the peripheral device 37 are placed on the screen according to the real placement on an actual working site, and basically cannot be moved. Further, data about a sequence of task points or an operation path required for operation (grasping, welding or laser machining, for example) to be performed on the workpiece 36 can be generated mainly from data about the shape, size, placement (position and orientation) of the workpiece 36, for example in the robot operation/placement arithmetic unit 17, and appropriately displayed on the screen 13 through keyboard operation or the like. On the assumption that data about a sequence of task points or an operation path for the robot is already given, a process relating to determination of an optimum placement for the robot 1, calculation of a margin index, etc. will be described below.

FIG. 2 is a flow chart showing an overall process in the present embodiment.

First, using given data about the sequence of task points or the operation path, etc., a "provisional placing range" for the robot is determined (Step S1). This is a sort of "first-stage selection". The range determined as the provisional placing range in Step S1 includes placements (positions/orientations) which is inappropriate in view of various limitations on actual operation (acceleration limit, for example). The modifier "provisional" is added for this reason. The specific way of determining the provisional placing range will be described later.

Then, the robot is placed at points within the provisional placing range selected in Step S1, and simulation of operation is performed to collect data for evaluating those placement points from various aspects (Step S2). The data items about which data is collected, etc. will be described later.

Next, evaluation is performed from various aspects by comparing the data collected in Step S2 with evaluation criterions for the individual aspects (Step S3).

Further, the results of evaluation from one or more aspects are evaluated using an evaluation function, and an optimum placement (possibly, optimum placements) is selected. An example of the evaluation function, etc. will be described later.

The above-mentioned steps will be described in detail below.

Description of Step S1;

(A) In order to select a provisional placing range, the following data is fed to the robot off-line simulation apparatus (hereinafter referred to simply as "apparatus") shown in FIG. 1:

(1) Data about the size and shape of the robot (including a hand, if any);

(2) Data about the placing position/orientation, size and shape of the workpiece and of the peripheral device;

Data (1) and (2) is fed to the apparatus, for example in the manner that data prepared by an external CAD system or prepared in an electronic medium is transferred to the apparatus.

(3) Data about the sequence of task points for an intended operation of the robot.

Regarding what is fed as data about the sequence of task points, four ways as shown in FIGS. 3a-3d are conceivable. In the description below, the attached letter "i" represents the position of a task point in the sequence of task points and means the "i-th" task point.

(a) Only the three-dimensional position of each task point: Pi (Xi, Yi, Zi)

(b) The three-dimensional position of each task point and the direction of the normal to the task surface (the direction of the z-axis at each task point; normally, the direction of the z-axis of the tool coordinate system): Pni (Xi, Yi, Zi, ni)

(c) The three-dimensional position of each task point, the direction of the normal to the task surface (the direction of the z-axis at each task point; normally, the direction of the z-axis of the tool coordinate system), and the orientation as rotation about the normal (for example, the direction of the z-axis of the tool coordinate system and the orientation as rotation about this z-axis): Pn θi (Xi, Yi, Zi, ni, θi)

(d) The three-dimensional position of each task point and the three-dimensional orientation at each task point: PiWPR (Xi, Yi, Zi, Wi, Pi, Ri).

For convenience sake, the sequence of task points about which data is fed in any of the above four ways is represented by PI (I=1, 2, 3 . . . ). An example of a sequence of task points is shown on the left side of FIG. 4 (P1 to P4 are shown as an example of a sequence of task points)

(4) Data specifying a candidate for the range in which the robot can be placed (hereinafter referred to also as "a candidate placing range")

Figure 5:
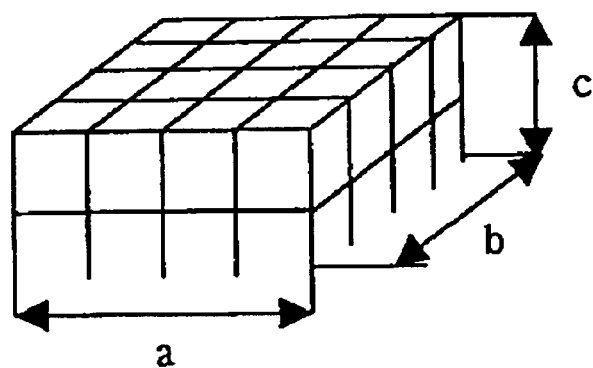
FIG. 5 is a diagram for explaining a candidate for a placing range.

On the basis of the data specifying a candidate for the range in which the robot can be placed, lattice points in this candidate placing range are determined, and data about the determined lattice points are fed to the apparatus. For example, this may be performed as follows: As shown in FIG. 5, the width a, the depth b and the height c of the candidate placing range is divided by an appropriate numerical value to obtain lattice points as candidates for the point at which the robot can be placed (hereinafter referred to also as "candidate placement points") QK, and data about these candidate placement points is fed to the apparatus. It is to be noted that if the placement orientation of the robot should be taken into consideration, data about the orientation is also fed to the apparatus. Regarding what is fed as data about the candidate placement points, three ways will be mentioned below as examples.

The letter "k" is used to represent one of the candidate placement points (the origin of the base coordinate system, for example) and means the "k-th" candidate placement point. An example of data in each of the three ways will be shown about a candidate placement point Qk as a representative.

(e) Only the three-dimensional position of each candidate placement point: Qk (Xk, Yk, Zk)

(f) The three-dimensional position of each candidate placement point and the direction of the normal to the robot base (normally, the direction of the z-axis of the robot-base coordinate system): Qnk (Xk, Yk, Zk, nk)

(g) The three-dimensional position of each candidate placement point, the direction of the normal to the robot base (normally, the direction of the z-axis of the robot-base coordinate system), and the orientation as rotation about the normal (for example, the direction of the z-axis of the robot-base coordinate system and the orientation as rotation about this z-axis): Qn θn (Xk, Yk, Zk, nk, θk)

Figure 4:
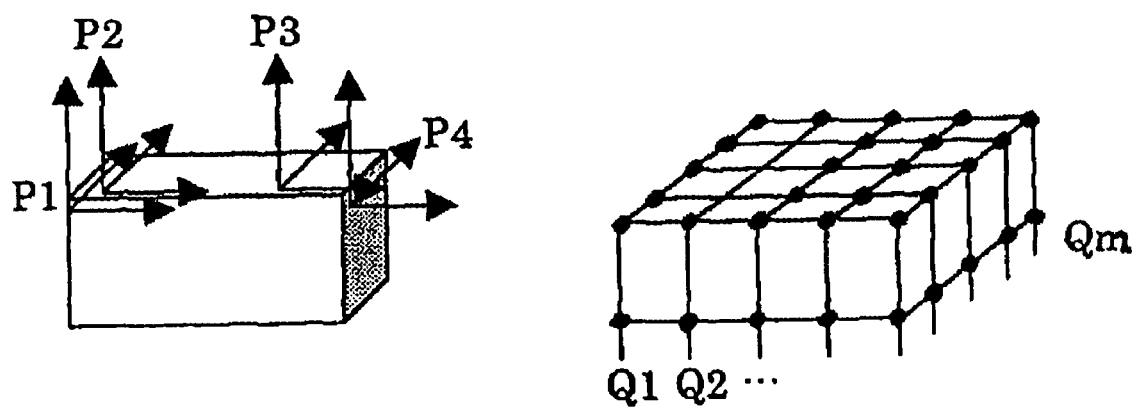
FIG. 4 shows a relationship between a sequence of task points and a candidate placing position (point) group.

An example of a candidate placement point group is shown on the right side of FIG. 4 (lattice points Q).

(B) The robot is placed at each of the candidate placement points Qk, where regarding the entire sequence of task points PI, an attempt to solve the inverse kinematics is made. If the solution to the inverse kinematics is found at a certain candidate placement point, that candidate placement point is identified as a "solution found point".

J: Isolve (Q-1P), where Q is a candidate placing position as seen in the world coordinate system, P is a task point as seen in the world coordinate system, J is the axis values of the robot, and Isolve is the inverse kinematics. If J is found at a certain candidate placement point, that candidate placement point is identified as a "solution found point".

Further, regarding each of the "solution found points", whether or not the robot (including a hand, if any) will interfere with the workpiece or the peripheral device is determined. This determination will be performed as described below, for example.

Regarding each of the "solution found points", the volumetric region occupied by the robot (including a hand, if any) when the robot is at each of the task points is calculated, using the axis values of the robot obtained corresponding to each of the task points, data about the shape and size of the robot, and if the robot has a hand, data about the shape and size of the hand. If even only a part of the volumetric region occupied by the robot when the robot is at a certain task point is included in the volumetric region occupied by the workpiece or that occupied by the peripheral device, it means that the robot will interfere with the workpiece or the peripheral device at that task point. Hence, the solution found point in question is identified as an "interference causing point".

If regarding a certain solution found point, it is determined that the interference will not occur at any of the task points, that solution found point is identified as a "reachable point".

The range to which the robot reach from the reachable points (volumetric region) is referred to as a "reachable range". Further, for example the distance from each of provisional placing positions (points) to the boundary of this reachable range may be calculated as an index of a margin for interference. The results of these calculations are stored in the memory and displayed on the screen 13 appropriately as described later.

It is to be noted that in the actual calculation of the inverse kinematics, addition or processing of information is needed depending on what data has been fed about the sequence of task points and the candidate placement points. A brief explanation of this will be provided below.

(Task Points)

(1) In the case in which the three-dimensional position of each task point Pi (Xi, Yi, Zi) has been fed:

In this case, a three-dimensional orientation element is required and needs to be given. WPR is calculated in the manner described below and all the obtained elements are used as calculational candidates in calculation of the provisional placing range.

Let P be a to-be-obtained three-dimensional position and orientation. As generally known, P can be expressed as P: (n, o, a, p), where "n" is a normal vector, "o" is an orient vector, "a" us an approach vector, and "p" is a position vector.

Figure 6:
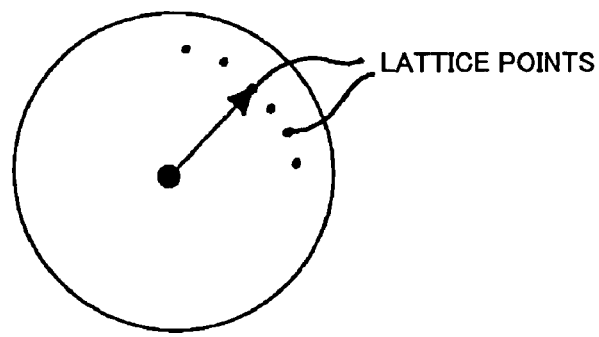
FIG. 6 is a diagram for explaining how to determine an approach vector a, an orient vector o, and a normal vector n.

As shown in FIG. 6, the surface of a unit sphere having a center position p is divided equally by an appropriate number of parallels of latitude and an appropriate number of longitudes to produce a large number of lattice points. The approach vector "a" is defined as a vector extending from the center of the sphere to each of the lattice points. The orient vector "o" is defined as a vector obtained by rotating the approach vector "a" along the longitude used for defining the approach vector a through 90°. The normal vector "n" is defined as a vector determined to be perpendicular to the vectors "a" and "o".

By rotating the defined orient vector "o" and the defined normal vector "n" about the defined approach vector "a" in increments of an angle obtained by dividing 360° by m, calculational candidates for the task point are obtained. The calculation of the inverse kinematics is performed on all the calculational candidates for the task points obtained here.

(2) In the case in which the three-dimensional position of each task point and the direction of the normal Pni (Xi, Yi, Zi, ni) have been fed:

This case can be considered as the case (1) in which the direction of the normal, namely the approach vector has been determined. After giving the approach vector, the calculation is performed in the same manner as in the case (1).

(3) In the case in which the three-dimensional position of each task point, the direction of the normal and the orientation Pn θi (Xi, Yi, Zi, ni, θi) have been fed:

This case can be considered as the case (1) in which the direction of the normal, namely the range of calculation of the approach vector has been determined. After obtaining the approach vector, the calculation is performed in the same manner as in the case (1).

(4) In the case in which the three-dimensional position of each task point and the three-dimensional orientation at each task point PniWPR (Xi, Yi, Zi, Wi, Pi, Ri) have been fed:

In this case, since the three-dimensional position and orientation have been specified, the inverse kinematics can be calculated without any further processing.

(Candidate Placement Point)

(1) In the case in which a candidate placing range is specified, a lattice is specified and the calculation of the inverse kinematics is performed on the lattice points of the specified lattice. Although the three-dimensional position of each candidate placement point can be obtained from the point sequence Q consisting the lattice points each having a three-dimensional position, the orientation cannot be obtained, which means that the conditions for solving the inverse kinematics are not enough. Hence, the orientation is calculated like in the case of the task point.

In the case in which only the three-dimensional position has been fed, for each of the candidate placement points Q, all candidates for the approach vector a, the orient vector o and the normal vector n are calculated in the same manner as in the case (1) regarding the task point. In this way, all the calculational candidates are obtained for all the candidate placement points Q. The calculation of the inverse kinematics is performed on all these calculational candidates obtained here.

Also in the case in which only the three-dimensional position and the direction of the normal have been fed and the case in which the three-dimensional position, the direction of the normal and the orientation as rotation about the normal have been fed, all the calculational candidates are obtained for all the candidate placement points Q in the same manners as in the cases (2) and (3) regarding the task point, respectively.

Figure 7:
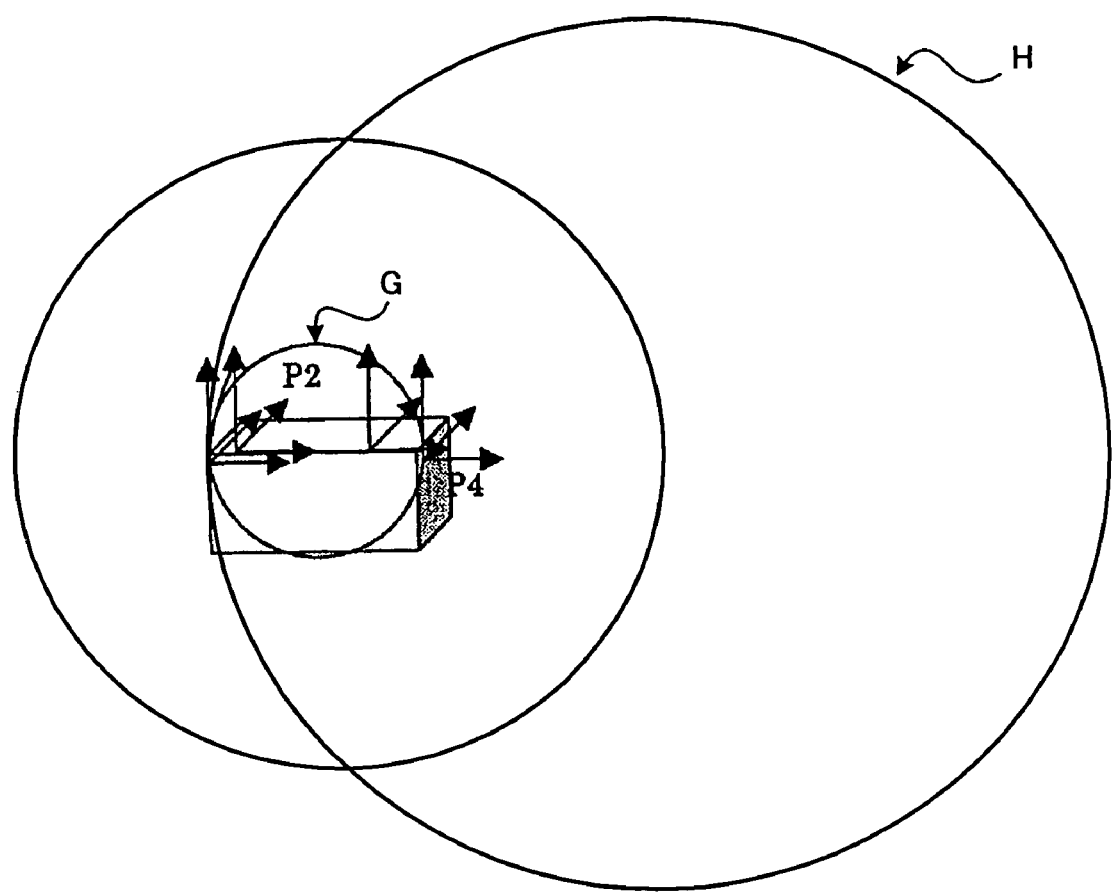
FIG. 7 is a diagram for explaining how to determine candidate placement points in the case in which there is no data specifying a candidate placing range.

In the case in which there is no data specifying a candidate placing range, candidate placement points are determined in the manner described below (see FIG. 7).

First, from the sequence of task points, a gravity point is obtained. Then, the distance between the gravity point and each task point of the sequence of task points is obtained. Then, a sphere G having a center at the obtained gravity point and a radius equal to the longest one of the obtained distances is obtained as a task-point sphere. Further, a robot reachable sphere H, namely a sphere reachable for the robot is defined. The robot reachable sphere is arranged so that it circumscribes the task-point sphere. Then, a sphere having a radius equal to the difference between the diameter of the robot reachable sphere and the radius of the task-point sphere and having a center at the center of the task-point sphere is defined. Then, a cuboid enclosing this sphere is defined (the length, width and height of the cuboid define an X-axis direction, a Y-axis direction and a Z-axis direction, respectively). Then a lattice is defined by equally dividing the cuboid in the X-axis direction, in the Y-axis direction and in the Z-axis direction. All the lattice points of the defined lattice are considered as candidate placement points.

Figure 8:
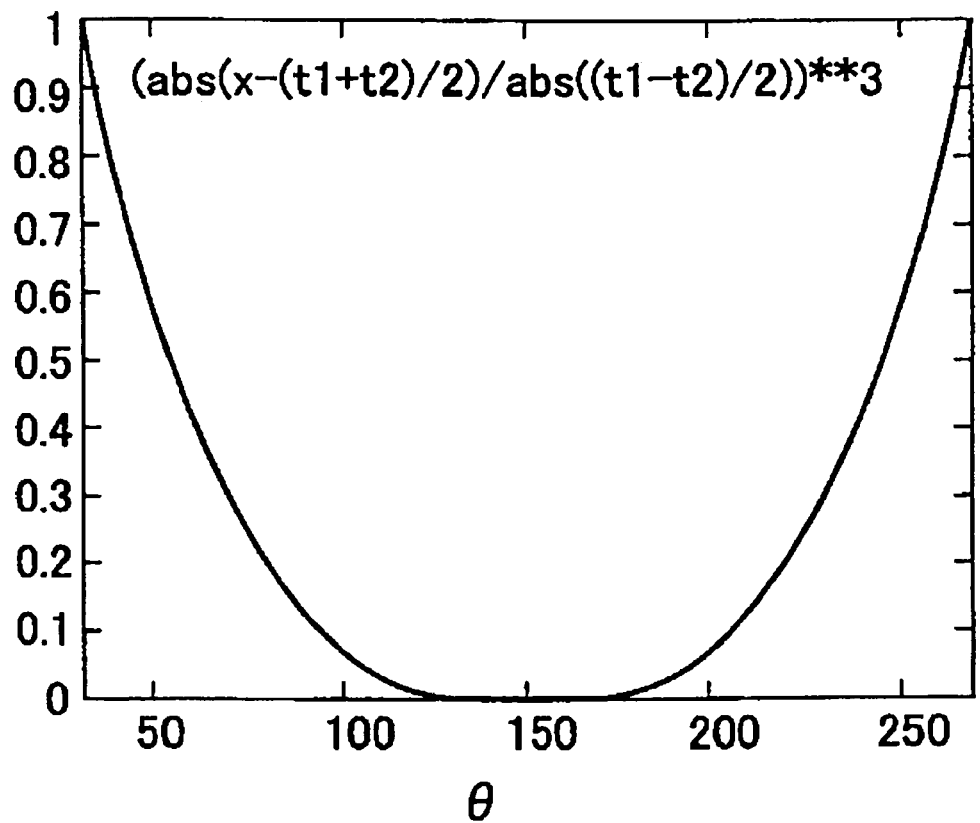
FIG. 8 is a graph of an example of a function for determining an operation margin index.

When the inverse kinematics is solved, the axis values at each of the task points are obtained. The robot has an allowable range for the axis values (operating range), which is determined by the robot model. Generally, operation on the edge of the operating range is not good. Having a margin is preferable. Hence, an operation margin index is obtained using a function on the basis of the operating range of the axes. The function is so defined that it has value 0 when there is no margin and value 1 when there is a maximum margin. A graph of an example of the function is shown in FIG. 8. The definition of the function is also shown in FIG. 8. Data about this function is stored in advance in the memory of the apparatus and used in the calculation of the operation margin index. The operation margin index calculated for each task point and for each candidate placement point is stored in the memory. Further, a criterion value for the operation margin index (the value of the above function=0.5, for example) is determined in advance, and only the candidate placement points which show the operation margin index satisfying the criterion value are identified as "provisional placing positions (points)" in Step S1. Data about those provisional placing positions (points) is also stored in the memory. To sum up, the necessary and sufficient condition for a certain candidate placement point being identified as a "provisional placing position (point)" in Step S1 is to satisfy all the three conditions mentioned below. In other words, of the candidate placing positions, only those placing positions (points) that satisfy all the three conditions mentioned below are identified as "provisional placing positions", and the range corresponding to the set of the provisional placing positions is a "provisional placing range.

(i) Regarding the entire sequence of task points, the inverse kinematics can be solved, namely the solution to the inverse kinematics is found.

(ii) Regarding the entire sequence of task points, the robot does not interfere with the peripheral device.

(iii) Regarding all the axes of the robot, the operation margin index satisfies the criterion value. It is to be noted that provisional placing positions may be determined considering, in addition to the above three conditions, a range that should be excluded from the provisional placing range, if any, on the basis of a user's wish, etc.

Description of Step 2;

The above-described Step 1 is a sort of first-stage test. Regarding those candidate placing positions which have passed this test (in other words, the provisional placing positions), it is desirable to further check whether they are suitable for the robot's actual operation or not. Thus, in Step 2, data for a sort of second-stage test is collected. Specifically, data for selecting a stricter provisional placing range by reviewing the provisional placing range from the aspect of operational trouble is collected.

For this purpose, operation programs (sometimes called "TP programs") are fed to the simulation apparatus, and simulation of operation is performed by means of the robot operation/placement arithmetic unit under the condition that the robot is placed at the provisional placing positions one after another. Thus, data for evaluating and checking performance items regarding the actual operation is collected. Obviously, the positional data included in the operation programs fed to the apparatus corresponds to the above-mentioned sequence of task points. The data collected is as mentioned below. Software for calculating this data is generally known, and here it is assumed that the software is installed in the apparatus in advance.

Cycle time
Duty (Average value of ratio of current value to limit value in one operation cycle)
Current peak value
Energy value (electric power consumption in one operation cycle)
Change in acceleration (value in each calculation cycle, for example)
Acceleration peak
Change in speed (value in each calculation cycle, for example)
Speed peak The data (cycle time, duty, current peak value, energy value, change in acceleration, acceleration peak, change in speed, speed peak) obtained by performing the simulation of operation is stored in the memory. A part or all of the obtained data is displayed on the screen 13 as described later.

Description of step S3;

Using the data collected in Step S2, each of the provisional placing positions is evaluated. The evaluation is performed, for example as follows: Criterion values (limit values) for all or some of the above data items are predetermined, and those provisional placing positions which satisfy all the predetermined criterion values (limits) are upgraded to "placing positions" (note that the modifier "provisional" is removed). Generally, it is practical to determine criterion values (limit values) for quantities relating to the performance limitations of the robot and not to upgrade those which do not satisfy the criterion values (limit values) to placing positions.

Here, by way of example, the following values are set in the apparatus as the criterion values (limit values) to be satisfied.

Limit value for the current peak value
Limit value for the acceleration (peak of the absolute value)
Limit value for the speed (peak of the absolute value)

To sum up, in the present embodiment, of the provisional placing positions, those which satisfy all these criterions are identified as "placing positions".

Description of Step S4;

The placing positions identified in Step S3 is evaluated using an appropriate evaluation function to determine an "optimum placement". It is to be noted that there may be more than one "optimum placements". For example, "three best placements" may be selected. Further, generally, which is an optimum placement depends on which aspect is emphasized. Here, by way of example, the function $F(\alpha;\beta)$ below, in which weightings can be determined and adjusted by an operator, is used as an evaluation function:

$$F(\alpha;\beta)=\alpha 1(M-\beta 1)+\alpha 2(M-\beta 2)+\ldots+\alpha u(M-\beta u)$$

Here, M is the total number of placing positions. $\beta 1, \beta 2, \ldots \beta n$ are ranks of a placing position in question given from a first aspect, a second aspect, . . . an uth aspect, respectively, each taking a value in the range of 1 to M. $\alpha 1, \alpha 2, \ldots \alpha u$ are weighting coefficients for the first aspect, the second aspect, . . . the uth aspect, respectively, and a value in the range of 0.0 to 1.0 is set for each of those weighting coefficients by an operator. The aspects may include the operation margin index obtained in step S1, when necessary, in addition to the data items about which data has been collected in Step S3. The following is an example where the total number M of placing positions is M100.

First aspect=how short the cycle time is. The placing position showing the shortest cycle time is given $\beta 1=1$, the placing position showing the second shortest cycle time is given $\beta 1=2$, and so on. The placing position showing the longest cycle time is given $\beta 1=100$.

Second aspect=how small the duty is. The placing position showing the smallest duty is given $\beta 2=1$, the placing position showing the second smallest duty is given $\beta 2=2$, and so on. The placing position showing the largest duty is given $\beta 2=100$. Third aspect=how small the energy value (electric power consumption in one operation cycle) is. The placing position showing the smallest energy value is given $\beta 3=1$, the placing position showing the second smallest energy value is given $\beta 3=2$, and so on. The placing position showing the largest energy value is given $\beta 3=100$.

When the above-mentioned three aspects are adopted, the above function F is as follows (where M=100):

$$F(\alpha;\beta)=\alpha 1(100-\text{rank in cycle time shortness }\beta 1)+\alpha 2(100-\text{rank in duty smallness }\beta 2)+\alpha 3(100-\text{rank in energy value smallness }\beta 3).$$

Here, for example if only the cycle time should be emphasized, the coefficients can be set such that $\alpha 1=1.0$ and $\beta 2=\alpha 3=0.0$. Likewise, if only the duty should be emphasized, the coefficients can be set such that $\alpha 2=1.0$ and $\alpha 1=\alpha 3=0.0$. If only the energy should be emphasized, the coefficients can be set such that $\alpha 3=1.0$ and $\alpha 1=\alpha 2=0.0$. If the three aspects should be taken into consideration, values that are not 0.0 should be set for $\alpha 1$, $\alpha 2$ and $\alpha 3$, individually. For example, the coefficients can be set such that $\alpha 1=1.0$ and $\alpha 2=\alpha 3=0.5$. The setting is performed by an operator looking at the screen 13 and operating the keyboard, for example.

After the value of the function $F(\alpha;\beta)$ is obtained regarding all the placing positions, an appropriate number of placing positions selected in descending order of the value of the function are identified as "optimum placing positions".

After the arithmetic processing in Steps S1 to S4 is finished, the results obtained are displayed on the screen 13 in the form of a list as shown in FIG. 9, for example. It is to be noted that although for graphic reasons, the displayed list shown in FIG. 9 includes only data about five placements, the displayed list may include all the candidate placing positions, all the provisional placing positions, all the placing positions, or the like if necessary. Regarding the evaluation items, although the displayed list shown in FIG. 9 includes the reachability, the cycle time and the margin index, the displayed list may include other items if necessary. For example, items such as the current peak value, the acceleration peak value, the energy value, the rank in the energy value (above-mentioned $\beta 3$), the rank in the cycle time (above-mentioned $\beta 1$) and the above-mentioned index of a margin to interference may be displayed in the same screen display or in a separate screen display.

Further, it may be so arranged that a range corresponding to all the provisional placing positions that have passed the test in Step S1 but has not passed the test in Step S3 is displayed in "yellow", and that a range corresponding to all the placing positions is displayed in "green", for example. Further, if the optimum placements selected in Step S4 are displayed as blue blinking points, for example, it is convenient because it allows a person to have an image of the optimum placements before going to an actual working site.

Figure 10:
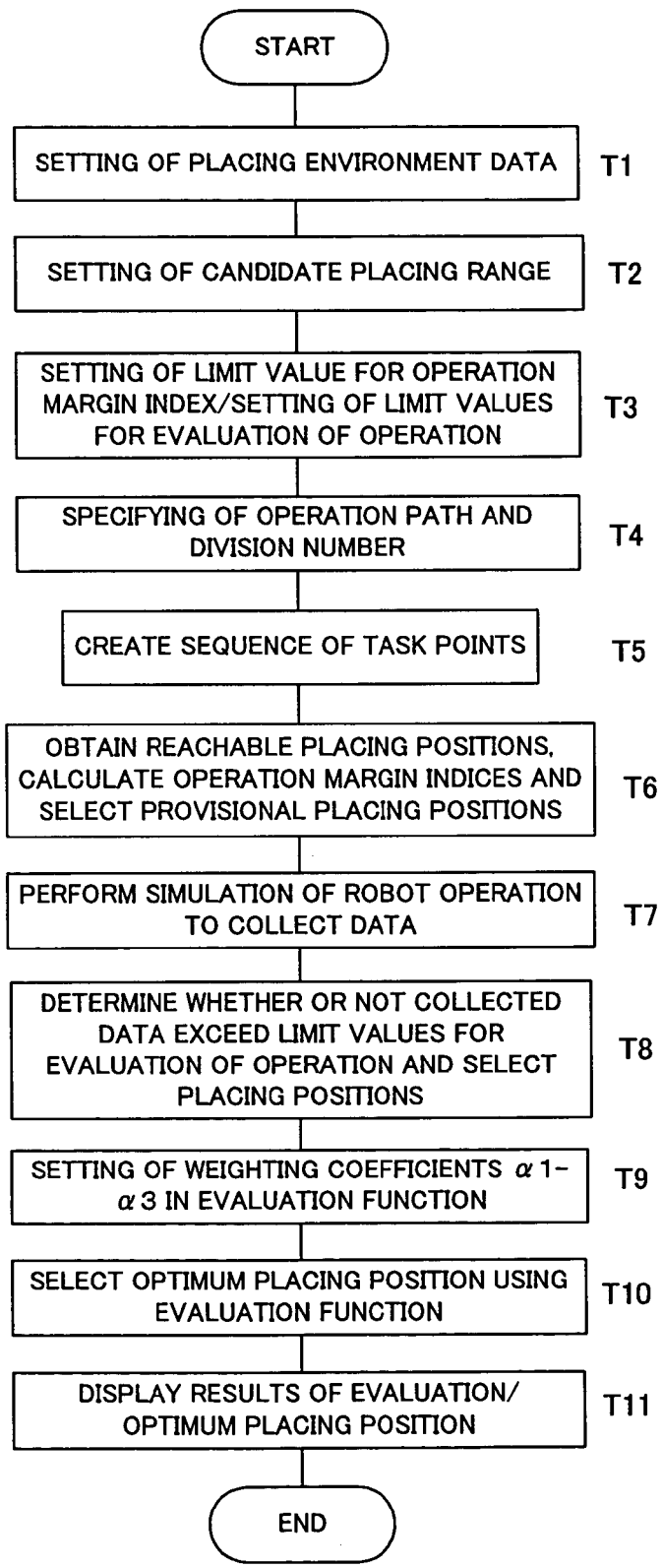
FIG. 10 is a flow chart showing essentials of a process in the case in which data about an operation path is given.

The above is the description of the embodiment given on the assumption that data about a sequence of task points for the robot is given. It is obvious that the present invention is applicable to the case in which data about an operation path is given in place of data about a sequence of task points. The latter case can be reduced to the described embodiment by generating data about a sequence of task points from data about an operation path. In place of giving a description similar to that given above, the essentials of the process from generating data about a sequence of task points from data about an operation path to obtaining optimum placing positions in the above-described manner is shown in the form of a flow chart in FIG. 10. The essentials of each step will be described below.

Step T1; Data about placing environment is specified and set. Like in the above-described embodiment, the data includes the following:

(1) Data about the size and shape of a robot (including a hand, if any), and (2) Data about the placing position/orientation, size and shape of a workpiece and of a peripheral device.

Step T2; A candidate for a placing range (a set of placing positions) is specified and set. An example of the way to specify the candidate is as described above.

Step T3; The limit value for the operation margin index for the axes of the robot is determined. Also the limit values (criterion values) for evaluation of operation are determined. The limit values for evaluation of operation are, for example the limit values for the current peak value, the acceleration (peak of the absolute value) and the speed (peak of the absolute value) as mentioned above.

Step T4; An operation path and a division number are specified. The division number is specified for generating a sequence of task points in the next step.

Step T5; A sequence of task points is created based on data of the operation path and the specified division number. The generation of the sequence of task points may be performed, for example as follows: The operation path $P(x, y, z)$ is converted into an expression $P(t)=(Px(t), Py(t), Pz(t))$ using a parameter t. By dividing the operation path from its start point having a t-value t0 to its terminal point having a t-value t1 by the specified division number, a sequence of task points consisting of (division number+1) of task points including the start point and the terminal point is generated. It is obvious that all the task points are on the operation path. Regarding the generated sequence of task points, there can be the following four cases: (a) the case in which only the three-dimensional position of each task point is specified; (b) the case in which the three-dimensional position of each task point and the direction of the normal to the task surface (the direction of the z-axis at each task point) are specified; (c) the case in which the three-dimensional position of each task point, the direction of the normal to the task surface (the direction of the z-axis at each task point), and the orientation as rotation about the normal are specified; and (d) the case in which the three-dimensional position of each task point and the three-dimensional orientation at each task point are specified. Explanation of how to deal with each case has been given above, so that it will be omitted here.

Step T6; Under the condition that the robot is placed at each of the candidate placing positions, an attempt to solve the inverse kinematics is made regarding the entire sequence of task points, and the candidate placement points at which the solution to the inverse kinematics is found are selected. Further, from these selected candidate placement points, only those which do not allow the robot to interfere with the peripheral device over the entire sequence of task points are selected. Further, regarding each of these selected candidate placement points, the operation margin index for the axes is calculated. Then, only those candidate placing positions regarding which the operation margin index for the axes satisfies the criterion value at all the task points are identified as provisional placing positions, and data about them is stored. It is to be noted that provisional placing positions may be determined considering, in addition to the above conditions, a range that should be excluded from the provisional placing range, if any, on the basis of a user's wish, etc.

Step T7; Operation programs (sometimes called "TP programs") are fed to the simulation apparatus, and simulation of operation is performed by means of the robot operation/placement arithmetic unit under the condition that the robot is placed at the provisional placing positions one after another. Thus, data for evaluating and checking performance items regarding the actual operation is collected. Obviously, the positional data included in the operation programs fed to the apparatus corresponds to the above-mentioned sequence of task points. Here, the data collected is the same as mentioned above. Specifically, it is as follows:

Cycle time

Duty (Average value of ratio of current value to limit value in one operation cycle)

Current peak value

Energy value (electric power consumption in one operation cycle)

Change in acceleration (value in each calculation cycle, for example)

Acceleration peak

Change in speed (value in each calculation cycle, for example),

Speed peak

Step T8; Regarding all the provisional placing positions, whether the limit values for the robot operation are exceeded or not is checked using the data collected by the simulation of operation, etc. Here, regarding the current peak value, the acceleration (peak of the absolute value) and the speed (peak of the absolute value), the values obtained by the simulation and the limit values are compared. The provisional placing positions which satisfy the limit values are identified as placing positions, and data about them is stored.

Step T9; The weighting coefficients $\alpha 1$ to $\alpha 3$ in the above-mentioned evaluation function $F(\alpha;\beta)$ are specified and set. This may be performed in Step T3.

Step T10; All the placing positions are evaluated using the evaluation function $F(\alpha;\beta)$, and an "optimum placement" is determined. As stated above, the number of optimum placements does not have to be one. For example, "three best placements" may be selected.

Step T11; After the arithmetic processing above is finished, the results obtained are displayed on the screen 13 in the form of a list as shown in FIG. 9, for example. As stated above, it may be so arranged that a range corresponding to all the provisional placing positions that have passed the test in Step T6 but has not passed the test in Step T8 is displayed in "yellow", and that a range corresponding to all the placing positions is displayed in "green", for example. Further, if the optimum placements selected in Step T10 are displayed as blue blinking points, for example, it is convenient because it allows a person to have an image of the optimum placements before going to an actual working site.

What is claimed is:

1. A robot off-line simulation apparatus for simulating an operation of a robot placed with a workpiece and a peripheral device in a three-dimensional space by simultaneously displaying three-dimensional models of the robot, the workpiece and the peripheral device on a screen, comprising:
    means for determining discrete positions at which a base of the robot is to be placed, the robot with the base placed at each of the discrete positions being reachable to a preset sequence of task points for performing tasks on the workpiece;
    means for obtaining an index representing an operation margin of the robot with respect to a placing range thereof, when the robot with the base placed at each of the discrete positions reaches the sequence of task points; and
    means for displaying the discrete positions and the obtained indices for the respective discrete positions on the screen.

2. A robot off-line simulation apparatus according to claim 1, wherein each of the task points is given one of a three-dimensional position, a combination of the three-dimensional position and a direction vector, and a combination of the three-dimensional position and an orientation, for performing the task on the workpiece by the robot.

3. A robot off-line simulation apparatus according to claim 1, further comprising means for determining whether or not the robot with the base placed at each of the discrete positions interferes with one of the workpiece and the peripheral device when the robot reaches to the sequence of task points, and means for displaying a result of the determination on the screen.

4. A robot off-line simulation apparatus according to claim 1, further comprising means for simulating an operation of the robot with the base placed at each of the discrete positions according to an operation program, to obtain an evaluation value regarding an operation performance of the robot using an evaluation function, means for selecting at least one of the discrete positions for which the evaluation values are preferable, and means for displaying the selected discrete positions on the screen.

5. A robot off-line simulation apparatus according to claim 4, wherein the evaluation function is prepared for evaluating the operation performance of the robot with respect to cycle time.

6. A robot off-line simulation apparatus according to claim 4, wherein the evaluation function is prepared for evaluating the operation performance of the robot with respect to duty.

7. A robot off-line simulation apparatus according to claim 4, wherein the evaluation function is prepared for evaluating the operation performance of the robot with respect to energy.

8. A robot off-line simulation apparatus according to claim 4, further comprising means for determining whether or not the robot with the base placed at each of the discrete positions interferes with one of the workpiece and the peripheral device when the robot reaches to the sequence of task points, and means for displaying a result of the determination on the screen.

9. A robot off-line simulation apparatus for simulating an operation of a robot placed with a workpiece and a peripheral device in a three-dimensional space by simultaneously displaying three-dimensional models of the robot, the workpiece and the peripheral device on a screen, comprising:
    means for determining discrete positions at which a base of the robot is to be placed, the robot with the base placed at each of the discrete positions being reachable to a preset operation path of the robot for performing tasks on the workpiece;
    means for obtaining an index representing an operation margin of the robot with respect to a placing range thereof, when the robot with the base placed at each of the discrete positions reaches the operation path; and
    means for displaying the discrete positions and the obtained indices for the respective discrete positions on the screen.

10. A robot off-line simulation apparatus according to claim 9, wherein the operational path is given one of a direction vector and an orientation for performing the task on the workpiece by the robot.

11. A robot off-line simulation apparatus according to claim 9, further comprising means for determining whether or not the robot with the base placed at each of the discrete positions interferes with one of the workpiece and the peripheral device when the robot reaches to the operation path, and means for displaying a result of the determination on the screen.

12. A robot off-line simulation apparatus according to claim 9, further comprising means for simulating an operation of the robot with the base placed at each of the discrete positions according to an operation program, to obtain an evaluation value regarding an operation performance of the robot using an evaluation function, means for selecting at least one of the discrete positions for which the evaluation values are preferable, and means for displaying the selected discrete positions on the screen.

13. A robot off-line simulation apparatus according to claim 12, wherein the evaluation function is prepared for evaluating the operation performance of the robot with respect to cycle time.

14. A robot off-line simulation apparatus according to claim 12, wherein the evaluation function is prepared for evaluating the operation performance of the robot with respect to duty.

15. A robot off-line simulation apparatus according to claim 12, wherein the evaluation function is prepared for evaluating the operation performance of the robot with respect to energy.

16. A robot off-line simulation apparatus according to claim 12, further comprising means for determining whether or not the robot with the base placed at each of the discrete positions interferes with one of the workpiece and the peripheral device when the robot reaches to the operation path, and means for displaying a result of the determination on the screen.

17. A method for optimizing placement of a robot executing a sequence of operations, comprising:
    calculating operation margins for discrete positions of a robot in a work environment;
    calculating an evaluation function for each of the discrete positions, the evaluation function being a sum of terms, each term being a weighted value or ranking of the discrete point according to one of a plurality of aspects, which includes the operation margins;
    displaying a predetermined number of points in descending order of a corresponding value of the evaluation function.

* * * * *

UNITED STATES PATENT AND TRADEMARK OFFICE
CERTIFICATE OF CORRECTION

| | | |
|---|---|---|
| PATENT NO. | : 7,512,459 B2 | Page 1 of 1 |
| APPLICATION NO. | : 10/882240 | |
| DATED | : March 31, 2009 | |
| INVENTOR(S) | : Atsushi Watanabe et al. | |

It is certified that error appears in the above-identified patent and that said Letters Patent is hereby corrected as shown below:

Column 1, Line 17, change "-on" to --on--.

Column 10, Line 34, after "$F(\alpha;\beta) = \alpha 1(M-\beta 1)+\alpha 2(M-\beta 2)+...+\alpha u(M-\beta u)$" insert --.--.

Column 11, Line 3, change "$\beta 2$" to --$\alpha 2$--.

Signed and Sealed this

Fourth Day of August, 2009

JOHN DOLL
*Acting Director of the United States Patent and Trademark Office*